(12) United States Patent
Born et al.

(10) Patent No.: US 7,975,994 B2
(45) Date of Patent: Jul. 12, 2011

(54) DISPLACEMENT ELEMENT

(75) Inventors: Frank Born, Dienethal (DE); Rainer Massmann, Bonn (DE); Rolf Mintgen, Thuer (DE); Dirk Rennecke, Andernach (DE); Wilhelm Schwab, Koblent (DE)

(73) Assignee: Stabilus GmbH, Koblenz (DE)

( * ) Notice: Subject to any disclaimer, the term of this patent is extended or adjusted under 35 U.S.C. 154(b) by 1268 days.

(21) Appl. No.: 11/602,903

(22) Filed: Nov. 21, 2006

(65) Prior Publication Data

US 2007/0114103 A1    May 24, 2007

(30) Foreign Application Priority Data

Nov. 24, 2005 (DE) .......................... 10 2005 056 005

(51) Int. Cl.
*F16F 5/00* (2006.01)
(52) U.S. Cl. ......... 267/120; 267/226; 267/124; 188/284
(58) Field of Classification Search .................. 267/226, 267/120, 124; 188/284, 286, 287, 288
See application file for complete search history.

(56) References Cited

U.S. PATENT DOCUMENTS

| | | | | |
|---|---|---|---|---|
| 4,066,279 A | * | 1/1978 | Kaptanis .................... | 267/64.11 |
| 4,166,612 A | * | 9/1979 | Freitag et al. ............. | 267/64.15 |
| 4,230,309 A | | 10/1980 | Schnitzius | |
| 4,303,231 A | * | 12/1981 | Reuschenbach et al. .. | 267/64.15 |
| 4,307,874 A | * | 12/1981 | Reuschenbach et al. .. | 267/64.15 |
| 4,776,440 A | | 10/1988 | Yamada et al. | |
| 4,796,871 A | | 1/1989 | Bauer et al. | |
| 4,819,770 A | * | 4/1989 | Hahn ............................. | 188/284 |
| 4,909,488 A | | 3/1990 | Seibert et al. | |
| 5,509,512 A | * | 4/1996 | Grundei ........................ | 188/284 |
| 5,823,512 A | | 10/1998 | Oyaizu | |
| 5,961,102 A | * | 10/1999 | Oyaizu ......................... | 267/120 |
| 5,971,117 A | * | 10/1999 | Grundei et al. ............... | 188/288 |
| 5,988,608 A | * | 11/1999 | Koch ............................ | 267/120 |

(Continued)

FOREIGN PATENT DOCUMENTS

DE    26 59 488    7/1978

(Continued)

OTHER PUBLICATIONS

European Search Report dated Apr. 2, 2007 in corresponding Patent Application No. 06020229.8.

*Primary Examiner* — Bradley T King
(74) *Attorney, Agent, or Firm* — Cohen Pontani Lieberman & Pavane LLP

(57) ABSTRACT

A displacement element includes a first piston, a second piston, a cylindrical housing filled with a fluid under pressure, a piston rod, and a spring. Each of the pistons is adapted to the respective internal diameter of its section and divides the respective section into two pressure chambers. The first piston is arranged at one end of the piston rod, and both pistons each include means for damping the movement of the piston rod respectively in one direction. The second piston is arranged on the side of the first piston facing away from the piston rod and is capable of displacement by means of the first piston in a direction facing away from the open end. The spring is arranged on the side of the second piston facing away from the first piston, and supported by the second piston and the housing.

11 Claims, 3 Drawing Sheets

U.S. PATENT DOCUMENTS 6,213,261 B1 * 4/2001 Kunkel .................. 188/314
2006/0290037 A1 12/2006 Born et al.

FOREIGN PATENT DOCUMENTS

| DE | 34 35 135 | 4/1985 |
|---|---|---|
| DE | 38 18 811 | 12/1989 |
| DE | 198 29 765 | 2/1999 |
| DE | 103 16 912 B3 | 10/2004 |
| DE | 10 2005 002 007 | 3/2006 |
| GB | 2 1 48 449 | 5/1985 |
| JP | 85272 | 7/1978 |
| JP | 6 023142 | 11/1985 |
| JP | 62 050342 | 3/1987 |
| JP | 62 170846 | 10/1987 |
| JP | 8 105482 | 4/1996 |
| JP | 217773 | 8/1997 |
| JP | 2003028225 | 1/2003 |

* cited by examiner

DISPLACEMENT ELEMENT

BACKGROUND OF THE INVENTION

1. Field of the Invention

The invention relates to a displacement element having a cylindrical housing filled with a fluid under pressure and exhibiting two sections of different internal diameter, to which sections a piston capable of axial displacement is allocated in each case. Each of the pistons is adapted to the respective internal diameter of its section and dividing the respective section of the cylindrical housing into two pressure chambers. Each of the pistons has a piston rod penetrating the housing at an open end, which first piston is arranged at one end of the piston rod present in the housing and each of the two pistons possessing means for damping the movement of the piston rod respectively in one direction. The displacement element finds an application in pivotally mounted components, and in particular for the hoods or rear hatches of motor vehicles.

2. Description of the Related Art

A displacement element of this kind is disclosed in U.S. Pat. No. 4,230,309 which permits damping of the movement of the piston rods before reaching the end position of the retraction and extension movement. For this purpose, the displacement element possesses a cylindrical housing that is filled with a fluid under pressure. The cylindrical housing exhibits a larger internal diameter at its closed end than at its open end. The first piston arranged at the end of the piston rod is adapted to the housing in the section of the larger internal diameter, whereas the second piston is adapted to the section of the housing with a smaller internal diameter. In this way, the movement of the piston rod is determined by the second piston to the extent that it moves in the section of the housing with a smaller internal diameter.

The remaining stroke of the piston rod is influenced by the first piston. To influence the piston stroke, both pistons exhibit means for damping the movement. A piston ring capable of axial displacement is arranged on each piston between a supporting ring and a collar. The piston ring possesses a larger internal diameter than the area of the piston in which the piston ring is movably mounted. The annular gap formed in this way between the piston ring and the piston permits the fluid to flow between the pressure chambers. The annular gap is exposed or blocked by directionally-dependent contact of the piston ring against the supporting ring or against the collar. For the purpose of ensuring undamped movement of the piston rod, the first piston in addition exhibits an axially oriented bore, which is opened and closed by the axially moving piston ring depending on its position. The second piston possesses a locking device in addition to the axially moving piston ring. This consists of bores in the second piston, a valve plate for closing off the bores, a spring for pre-tensioning the valve plate, and a stop for the spring against the piston rod.

As the piston rod is extended, the piston ring of the first piston, because of its position, exposes an annular cross section between the first piston and the internal wall of the housing on the one hand and the bore on the other hand. The fluid is thus able to flow through the exposed bore and through the annular gap between the piston and the internal wall of the housing. Essentially no damping is perceivable in conjunction with this.

As soon as the second piston enters the section of the housing with a smaller internal diameter, the fluid flows through the internally situated annular gap in the piston ring and the supporting ring which retains the piston ring. The locking device is closed, so that no fluid is able to flow via the bores in the second piston. The extension movement is damped in this way.

As the piston rod is retracted, the fluid once again flows via the annular gap on the second piston. The locking device opens in addition, thereby enabling the undamped retraction of the piston rod in this section. As soon as the second piston emerges from the section of the housing with the smaller internal diameter, the further course of movement is determined by the first piston. As a consequence of the retraction movement, the piston ring closes the annular cross section between the first piston and the internal wall of the housing. The fluid is thus able to flow exclusively via the axially oriented bore in the first piston, as a consequence of which damping of the retraction movement of the piston rod is brought about.

A disadvantage associated with this displacement element is the intricate design of the piston. The second piston provided for the purpose of damping the extension movement with the locking device consisting of a plurality of components thus forms a complex unit, to be able to achieve the damping. End position damping, shortly before reaching the maximum extension position of the piston rod, is not possible in spite of the intricacy of the design. Damping of the retraction movement also requires an additional bore in the first piston.

Moreover, the displacement element is executed in such a way that the piston rod penetrates the housing on the side of the section with a smaller internal diameter. In order both to guide the piston rod and to seal the pressure chambers inside the housing from the atmosphere, this end must be closed with a sealing and guide package. For reasons associated with manufacture, the other end of the housing is also open. A consequence of this is that the second open end of the housing must be closed with an additional cylinder base in the end state. The cost of manufacturing the housing is thus also very high.

SUMMARY OF THE INVENTION

An object of the invention is to provide a displacement element that permits damping of the movement of the piston rod before reaching the end position in its retraction and extension movement. In this case, the displacement element should be as simple as possible in terms of its manufacture and assembly.

The object of the present invention is met in that the second piston is arranged on the side of the first piston facing away from the piston rod and is capable of displacement by means of the first piston in a direction facing away from the open end, in conjunction with which there is arranged, on the side of the second piston facing away from the first piston, a spring which is supported with its one end on the second piston and with its other end on the housing.

With the piston rod retracted, both pistons are present in the section which adjoins the closed end of the housing. The spring is compressed. If the hatch to be moved is opened, the piston rod is extended. The means for damping the movement on the first piston are not effective in this section, so that fluid during the movement of the first piston in this section flows around it without any significant resistance. The hatch is thus able to move undamped in this area of pivoting. The movement of the first piston accordingly remains without any effects on the second piston. The second piston is caused to move in the direction of the first piston only by the spring acting as a return element. The means provided in the second piston for damping the movement are not effective in this direction, and the piston is thus capable of being caused to move relatively easily by means of the spring.

Further pivoting of the hatch causes the first piston to enter the section of the housing that is allocated to the open end, the internal diameter of which is adapted to the first piston, so that the means for damping become effective during further movement of the hatch. Movement of the hatch to be pivoted is thus damped until the end position is reached.

For the purpose of closing the hatch, the piston rod enters the housing. The means for damping the movement of the first piston is not effective in this direction of movement. The movement of the hatch in this movement section is accordingly all but undamped. The second piston remains in its position during this movement of the first piston.

In the event of further retraction of the piston rod, the first piston comes into contact with the second piston and causes it to move in the direction of retraction. The presence of the means for damping the movement at the second piston in this direction of movement means that damping is initiated with the movement of the second piston, so that the hatch is caused to pivot in a damped manner until it reaches its end position.

Because of the freely mobile arrangement of the second piston in the housing, the second piston is not connected to the piston rod. The second piston consequently exhibits a significantly simpler construction. In addition, the assembly of the piston and the return of the second piston by means of a spring are particularly easy and do not involve any significantly greater cost.

The adjustment of the return force and the return path of the second piston can be varied within wide limits and can thus be adapted to the set operating conditions in each case by the dimensioning of a spring embodied as a helical compression spring.

In order to prepare a good engagement surface for the spring and, in so doing, to prevent tilting of the second piston, it is advantageous if the second piston possesses a seat for the spring on its side facing towards the spring. The seat can either be bowl-shaped, so that the spring is enclosed by the seat, or the seat can be embodied as a spigot, which engages in the spring in such a way that the spigot is enclosed by at least two coils.

An improved guide for the spring in the housing can be achieved by simple means, in such a way that the end of the spring facing away from the piston is also arranged in a seat, the seat being present at the end of the housing. A seat of this kind is particularly advantageous if the diameter of the spring is significantly smaller than the internal diameter of the housing. If the spring is a compression spring, it is then possible to dispense with a supplementary attachment of the seat in the housing, since the spring causes the seat to be pretensioned against the housing.

A particularly simple embodiment of the means for damping the movement is achieved by the arrangement of a piston ring capable of axial displacement on the two pistons between two defined axial points. The two defined axial points can be embodied as a collar on the piston or as a retaining ring and a supporting ring executed with recesses. The piston ring possesses a larger internal diameter than the area of the piston, so that the resulting annular gap permits a flow of the fluid. In this way, in the event of contact by the piston ring on the supporting ring, fluid is able to flow via the recesses and the annular gap. In the event of contact by the piston ring with the collar or the retaining ring, the annular gap is blocked and the fluid is only able to flow via an overflow connection between the pressure chambers, which gives rise to damping of the movement.

The overflow connection is particularly easy to design if it exhibits an overflow connection executed as a groove on the internal wall of the cylindrical housing. Various courses of movement of the pivoting hatch can be realized by means of a specific design of the groove. Overflowing of the fluid around the outsides of the two piston rings is made possible by the overflow connections executed as grooves. Bores to provided additionally in the piston can also be dispensed with, therefore, as can costly mechanisms for closing or opening the bores depending on the movement of the piston rod. The displacement element requires fewer component parts, as a consequence of which it is easier to manufacture, simpler to assemble and therefore more economical.

The design of the cross section of the groove, and in particular the depth of the groove, is determined in accordance with the place of use and the desired courses of movement for the displacement. A fairly large, required cross section for the groove can result in a large groove depth in this case, which in turn calls for a thick-walled cylindrical housing. The arrangement of a plurality of grooves with small groove depths situated on the periphery of the internal wall of the cylindrical housing enables an individual groove with a large groove depth to be avoided. The sum of the cross sections of the individual grooves produces the effective overall cross section for the overflow connection. A thick-walled housing is avoided in this way.

The strength of the cylindrical housing is influenced at least if the grooves are arranged symmetrically on the periphery of the internal wall.

The piston rings are subjected to different loadings depending on the stipulated marginal conditions for the particular application. An adaptation of the piston rings to the various loadings is already achieved by an appropriate choice of the cross section of the piston rings. In addition to round and oval cross sections, rectangular cross sections have also proved to be advantageous, in particular in the case of materials with high strength characteristics.

The means for damping the movement of the second piston can exhibit a sealing ring with a radially peripheral sealing lip facing elastically radially outwards and towards the spring, in conjunction with which the overflow connection of the second piston exhibits at least one groove having a small groove depth in relation to the width of the groove, into which the sealing lip is capable of being formed by moulding, and in conjunction with which the overflow connection of the second piston still exhibits at least one further groove, into which the sealing lip is not capable of being formed by moulding. Thanks to the oblique arrangement, the fluid which comes into contact with the sealing lip produces a radially outwardly acting force component which presses the outer edge of the sealing lip radially outwards, the sealing lip being formed in one of the grooves by moulding. At the same time, overflowing of the fluid in the opposite direction is facilitated, which now enables the fluid to produce a force component oriented radially inwards in the sealing lip, which causes the sealing lip to move away from the internal wall of the housing so that the overflow cross section is enlarged.

The groove cross section of the further groove prevents the sealing lip from being formed in the groove by moulding and blocks the cross section. The cross section of this groove thus determines the degree of damping. As the piston rod is extended, the sealing lip is caused to deform inwards as a consequence of the force component which now acts radially inwards, so that the cross section of the other grooves is exposed, thereby permitting even easier overflowing of the fluid around the second piston.

The further groove can exhibit a groove depth which corresponds more or less to the width of the groove.

The section of the housing, in which the second piston is arranged in such a way as to be capable of displacement, can exhibit a larger internal diameter than the section in which the first piston is so arranged as to be capable of displacement.

It is possible in this way for the second piston to be secured against undesired extension from the section allocated to it. The second piston is held securely in this section due to the reducing internal diameter at the transition from the section of the second piston to the section of the first piston.

Assembly of the second piston into the housing through the open end is made possible in a simple manner if the second piston exhibits on its side facing the first piston tongues facing radially outwards and towards the first piston, which tongues are arranged at a distance in relation to one another and extend radially outwards beyond the internal diameter of the section of the first piston, which in a further embodiment are arranged on the second piston on its side facing towards the first piston facing obliquely radially outwards and towards the first piston and at a radial distance to one another. In conjunction with assembly, the tongues are pushed radially inwards, so that the second piston can be inserted through the open end and the section for the first piston into the section for the second piston. As soon as the second piston reaches the section allocated to it, the tongues adopt their initial position. The tongues now act as a means of guarding against undesired extension, because they come into contact in the event of movement of the second piston in the direction of the first piston at the point of transition with reducing internal diameters and prevent further extension. Both pistons are thus capable of being assembled into the housing via an open end, in conjunction with which the open end is also capable of being arranged on the section with a smaller internal diameter without the need for a second seal for the cylindrical housing.

In another embodiment, an undesired extension of the second piston from its section is prevented by the attachment of the piston to the helical pressure spring. This attachment is executed advantageously as a press fit. The length of the helical pressure spring is executed in such a way that the second piston with the spring in its relaxed state is present close to the point of transition between the two sections. In this position, no spring forces act on the second piston. The end of the spring facing towards the housing is secured in an appropriate manner to the closed end of the housing or the seat for the spring.

In the event of movement of the second piston into the section of the first piston, the spring acts as a tension spring, by means of which the return of the second piston would be effected.

In the event of the displacement element being used to cause hatches to pivot, in particular hoods or rear hatches of motor vehicles, it is sensible to damp the movement of the hatches further shortly before reaching the end position. End position damping of this kind is achieved with a displacement element, of which the groove exhibits an area with a reducing cross section in the section facing towards the open end of the housing, which area corresponds to the area of the end position of the first piston with the piston rod extended. In view of the reducing cross section of the groove, the quantity of fluid that is capable of overflowing is reduced, as a result of which the speed of the extending piston rod is reduced. As a result of this end position damping, the stop elements of the displacement element are subjected to less stress.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
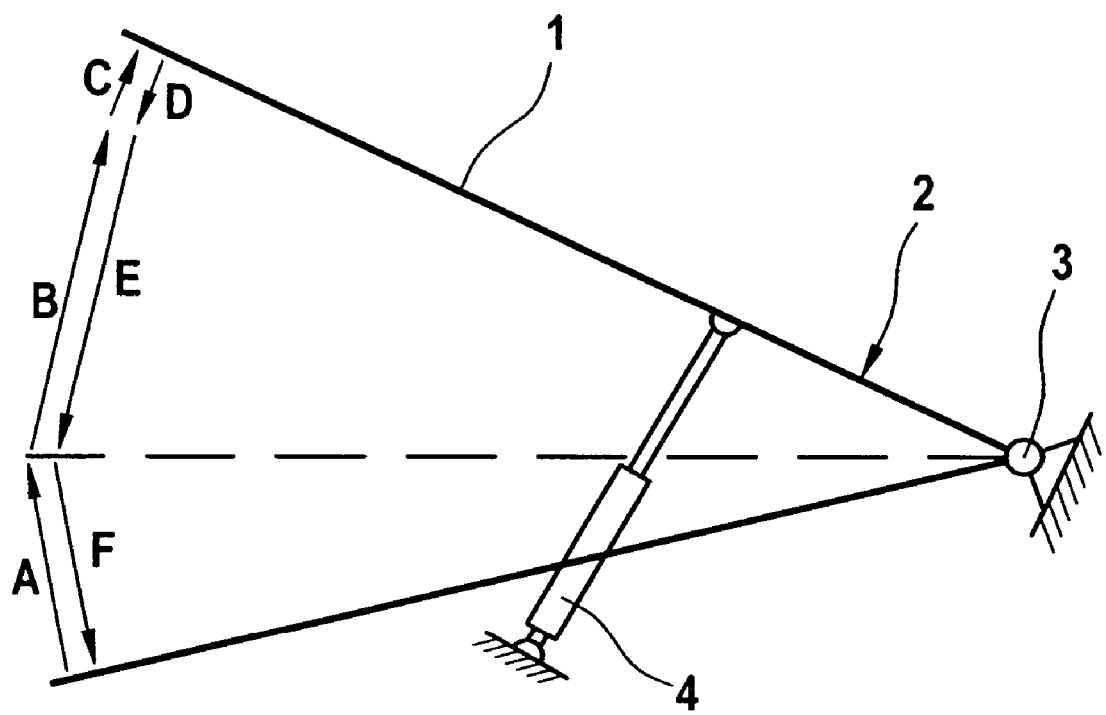
FIG. 1 is a schematic representation of a hood of a motor vehicle with a displacement element.

FIG. 1 depicts schematically the front area of a motor vehicle with a pivotable leaf 1 comprising, for example, a hood or hatchback of a motor vehicle. In the following description, the leaf 1 will be referred to as hood 1. However, the leaf may also comprise a hatchback or other leaf that is pivotable about a horizontal axis. The hood 1 is pivotally arranged at its rear end area 2 about a pivot axis 3 extending transversely to the longitudinal axis of the motor vehicle. A displacement element executed as a gas spring 4 is provided for the purpose of enabling the hood 1 to move. The individual courses of movement of the hood 1 during opening A-C and closing D-F are determined by the design of the gas spring 4 and are explained in more detail with reference to FIG. 2.

Figure 2:
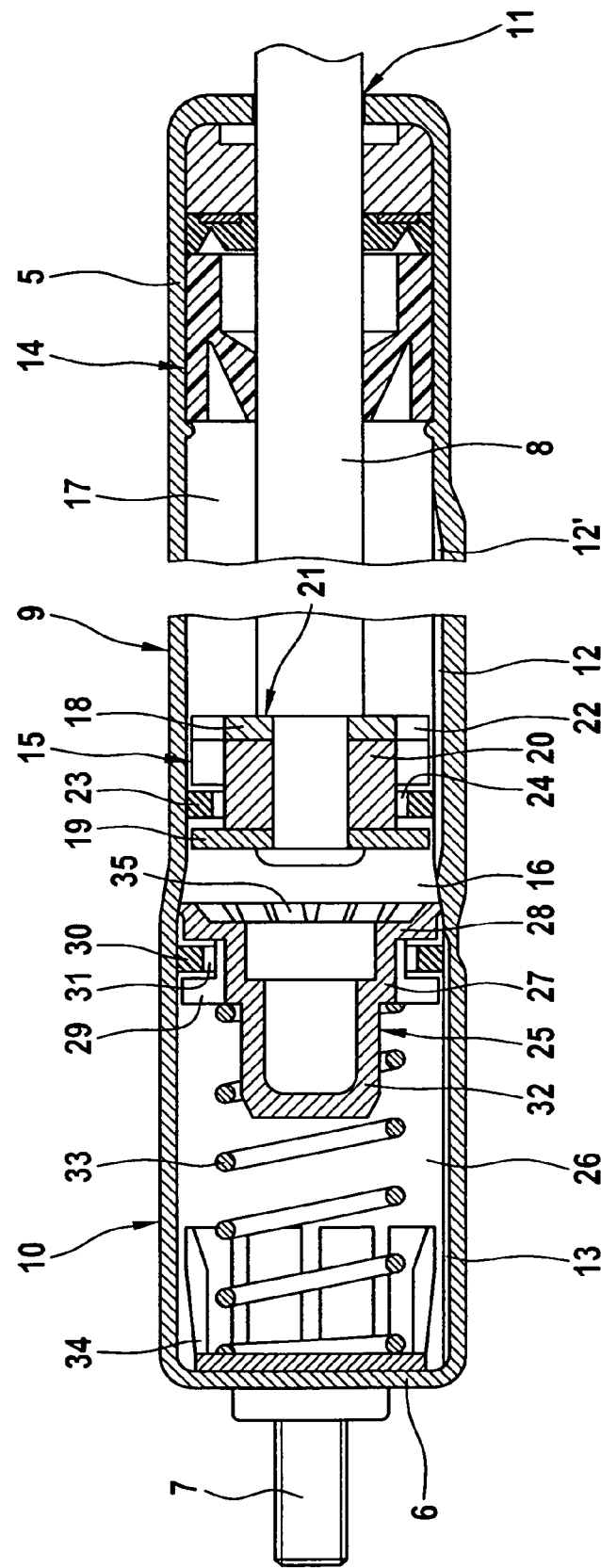
FIG. 2 is a section through the displacement element depicted in FIG. 1 in accordance with an embodiment of the invention.

The displacement element 4 depicted in FIG. 2 includes a cylindrical housing 5 executed in a single piece, which is filled with a gas under pressure. The cylindrical housing 5 possesses a seat 7 at a closed end 6, with which the displacement device 4 is secured to the body of the motor vehicle, although this is not illustrated here. The other end of the piston rod 8, also not illustrated here, is attached to the hood 1.

The cylindrical housing 5 possesses two sections 9, 10 with different internal diameters, the section 10 being provided with a larger internal diameter at the closed end 6, and the section 9 being provided with a smaller internal diameter at the open end 11. Each of the sections 9, 10 has an axially running groove 12, 13 defined on the internal wall of the cylindrical housing 5.

In the cylindrical housing 5, the piston rod 8, which penetrates the housing 5 at the open end 11, is so arranged as to be capable of axial displacement. The piston rod 8 is guided and sealed in relation to the cylindrical housing 5 by a sealing and guiding system 14 arranged at the open end 11.

A first piston 15 with a diameter adapted to the section 9 is arranged on the piston rod 8. The first piston 15 divides the housing 5 into two pressure chambers 16, 17. The first piston 15 has a supporting ring 18 and a retaining ring 19, between which a cylindrical piston body 20 is arranged, the retaining ring 19 also being cable of execution as a collar integrally with the piston body 20. The supporting ring 18 is supported by its side facing towards the open end 7 of the housing 5 on a collar 21 on the piston rod 8. The supporting ring 18 possesses a plurality of recesses 22 arranged around the periphery, via which the gas is able to overflow. Arranged on the cylindrical piston body 20 is a piston ring 23 of rectangular cross section, which is capable of axial displacement between the supporting ring 18 and the retaining ring 19. The axial mobility of the piston ring 23 depends on its greater internal diameter in relation to the piston body 20 and on the resulting annular gap 24.

The external diameter of the piston ring 23, which is larger than the external diameter of the retaining ring 19 and the supporting ring 18, corresponds to the internal diameter of the section 9 with a smaller internal diameter, so that the radially extending external surface of the piston ring 23 is capable of sliding along and in close proximity to the internal wall of the section 9.

Arranged in the section 10 of the housing 5 is a second piston 25, which does not exhibit a permanent connection to the piston rod 8 and divides the section 10 into two pressure chambers 16, 26. The second piston 25 consists of a cylindrical piston body 27 having a collar 28. A supporting ring 29 having a plurality of recesses arranged on its periphery is pressed onto the piston body 27. Arranged between the supporting ring 29 and the collar 28 is a piston ring 30 of rectangular cross section capable of axial displacement and having a larger internal diameter, such that an annular gap 31 is formed. The external diameter of the piston ring 30 corresponds to the internal diameter of the section 10, so that the radially extending external surface of the piston ring 30 is capable of sliding along and in close proximity to the internal wall of the section 10.

On its side facing towards the closed end 6, the second piston 25 possesses a seat embodied as a projection 32 for receiving and end of a helical pressure spring 33. The other end of the helical pressure spring 33 is accommodated in a seat 34 arranged in the housing. With the hood 1 closed, both pistons 15, 25 are situated in section 10.

Opening the hood 1 from a downward-inclined position (i.e., the closed position) causes the piston rod 8 to be displaced in the direction of the open end 11 of the cylindrical housing 5. In conjunction with this movement, the piston ring 23 of the first piston 15 that is capable of axial displacement is caused to move against the retaining ring 19. The annular gap 24 is blocked in this way. Because of its smaller external diameter in relation to the section 10, sufficient gas is able to overflow past the first piston 15, so that the piston rod 8 is capable of extending essentially undamped during the course of movement.

Notwithstanding the movement of the first piston 15, the second piston 25 is caused to move in the direction of extension by the helical pressure spring 33 that has been compressed to its blocking length and is now in the process of relaxing. The piston ring 30 is caused to be displaced by the gas against the direction of movement until it comes into contact with the supporting ring 29. The gas is able to overflow via the annular gap 31 and the recesses in the supporting ring 29 and the groove 13 from the pressure chamber 16 into the pressure chamber 26. The second piston 25 can be caused to move in this way undamped in the direction of the section 9, until tongues 35 formed on the collar 28 make contact with the transition to the section 9 because of the reducing internal diameter of the housing 5. The tongues 35 are arranged at a distance to one another, so that they do not constitute any significant flow resistance.

In the event of further extension of the piston rod 8 in the course of movement B, the piston ring 23 of the first piston 15 comes up against the retaining ring 19 and in so doing blocks the annular gap 24 between the piston ring 23 and the piston body 20. The gas in this case is able to overflow exclusively via the groove 12 and thus via the piston ring 23 from the pressure chamber 17 into the pressure chamber 16. This damping corresponds to the customary extension damping in conjunction with pivoting the hood 1 to its end position.

Shortly before reaching the end position, the first piston 15 enters the area 12', which corresponds to the course of movement C in FIG. 1. Less gas is able to overflow, because of the reducing cross section of the groove 12, as a consequence of which the movement of the first piston 15 and thus the piston rod 8 is damped further until the end position is reached.

For the purpose of closing the hood 1, the piston rod 8 travels in the opposite direction. In the course of this movement, the piston ring 23 of the first piston 15 moves against the supporting ring 18. In this way, the annular gap 24 between the piston ring 23 and the piston body 20 is exposed so that the gas is able to overflow from the pressure chamber 16 into the pressure chamber 17 via the groove 12, the annular gap 24 and the recesses 22. No retraction damping is thus perceptible in the courses of movement D and E.

As soon as the hood 1 is caused to pivot through the horizontal position, and in so doing passes through the point of equilibrium, the first piston 15 in the course of movement F makes contact with the second piston 25 and causes it to travel in the direction of the closed end 6. The gas overflowing from the pressure chamber 26 into the pressure chamber 16 causes the piston ring 30 of the second piston 25 to be displaced against the collar 28, so that the annular gap 31 is blocked. The gas is thus able to overflow exclusively via the groove 13, in conjunction with which the damping of the movement of the piston rod 8 and thus the hood 1 is achieved at a speed of 1.2 m/s to 1.5 m/s. Secure engagement of the hood 1 in a hood lock is assured at this speed.

Figures 3, 4:
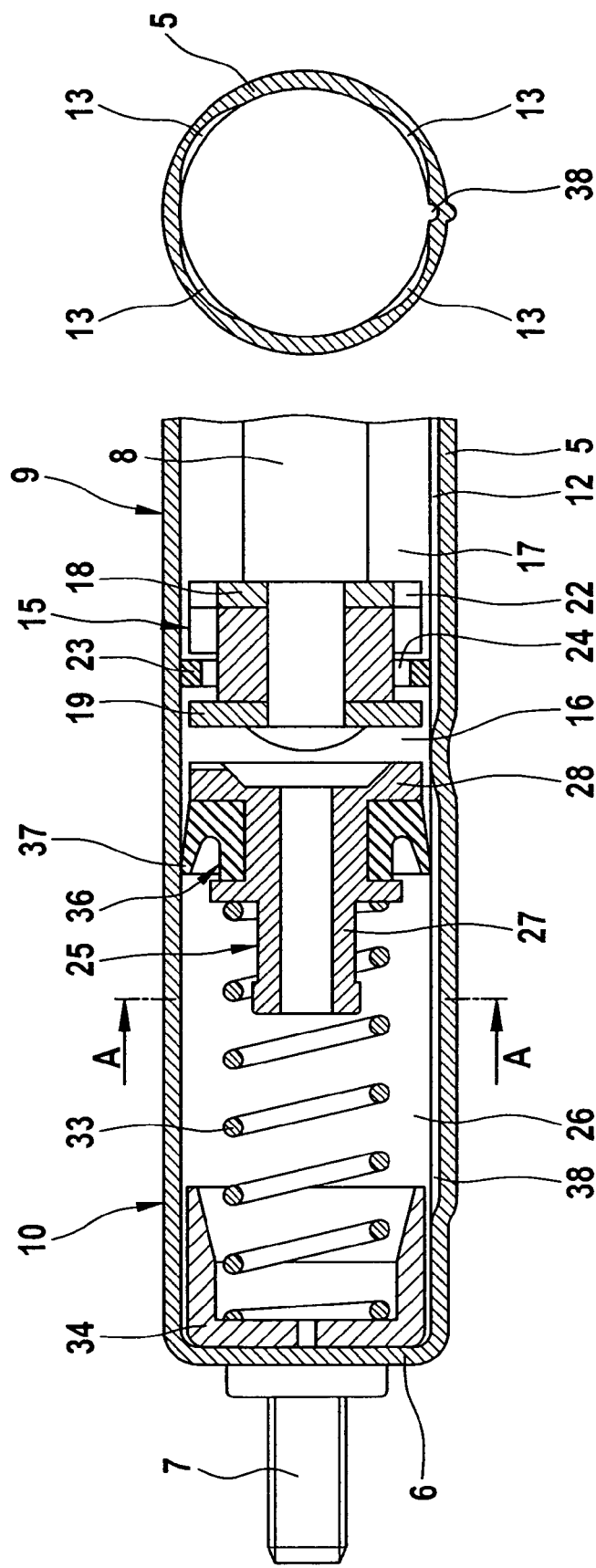
FIG. 3 is a section through a second embodiment of the displacement element.
FIG. 4 is the housing of the displacement element depicted in FIG. 3 in a section IV-IV.

FIG. 3 depicts a displacement element which differs in its construction from the displacement element in FIG. 2 in respect of the second piston 25. Instead of a piston ring and a supporting ring with recesses, the piston 25 possesses a sealing ring 36 with a sealing lip 37 extending radially and facing obliquely outwards and facing in the direction of the helical pressure spring 33. Its mode of operation is explained in conjunction with FIG. 4.

The housing 5 in FIG. 4 possesses four grooves 13 arranged uniformly on the periphery and an additional groove 38. Whereas the grooves 13 exhibit a small groove depth in relation to the width of the groove, the depth of the groove 38 more or less corresponds to its groove depth. Because of its elasticity, the sealing lip is capable of totally sealing the cross sections of the grooves 13. Only the cross section of the additional groove 38 cannot be closed due to the design of the cross section of the sealing lip 37. If the second piston 25 is displaced by the helical pressure spring 33 in the direction of the section 9, the gas overflowing from the pressure chamber 16 into the pressure chamber 26 produces a force component acting radially inwards on the sealing lip 37, in conjunction with which the sealing lip 37 exposes the cross sections of the grooves 13 and the gas is able to overflow essentially unhindered.

In the event of a movement in the opposite direction, the gas overflowing from the pressure chamber 26 into the pressure chamber 16 will now produce a force component acting radially outwards on the sealing lip 37. The sealing lip 37 is forced into the grooves 13 in this way, so that only the cross section of the groove 38 remains free. As a result of the significantly smaller cross section, the gas is able to overflow significantly more slowly, as a consequence of which the movement of the second piston 25 is damped.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice, It is the intention, therefore, to be limited only as indicated by the scope of the claims appended hereto.

What is claimed is:

1. A displacement element, comprising:
    a cylindrical housing filled with a pressurized fluid and having a closed end and an open end, said cylindrical housing having first and second sections, said second section of said cylindrical housing having an internal diameter that is larger than an internal diameter of said first section;
    a first piston arranged in said cylindrical housing and connected to a axially displaceable piston rod which extends sealingly through said open end of said cylindrical housing, said first piston having a diameter adapted to a diameter of said first section for dividing said first section into two pressure chambers;
    a second piston arranged in said cylindrical housing on a side of said first piston facing away from said piston rod, said second piston having a diameter adapted to a diameter of said second section for dividing said second section into two pressure chambers, said second piston being displaceable by said first piston in a direction away from said open end, wherein said first piston is being arranged to damp movement in one axial direction and said second piston is arranged to damp movement in another axial direction, said second piston comprises tongues facing radially outward and toward said first piston on a side of said second piston facing said first piston, said tongues being spaced apart circumferentially and extend radially outwards beyond the internal diameter of said first section; and
    a spring supported between said second piston and said closed end of said cylindrical housing.

2. The displacement element of claim 1, wherein said spring is a helical pressure spring.

3. The displacement element of claim 1, wherein the second piston comprises a projection on a side facing said spring for receiving an end of said spring.

4. The displacement element of claim 1, further comprising a seat arranged in said cylindrical housing for receiving an end of said spring facing away from said second piston.

5. The displacement element of claim 1, wherein each of the first and second pistons includes an axially displaceable piston ring configured to provide damping in one axial direction.

6. The displacement element of claim 5, each of said piston rings comprises one of a rectangular, round, or oval cross section.

7. The displacement element of claim 1, wherein a groove is defined on an internal wall of said cylindrical housing in at least one of said first and second sections creating an overflow connection around one of said first and second pistons for facilitating damping of axial movement.

8. The displacement element of claim 7, wherein a plurality of grooves are defined on a periphery of said internal wall of said cylindrical housing.

9. The displacement element of claim 8, wherein said grooves are arranged symmetrically on said periphery of said internal wall of said cylindrical housing.

10. The displacement element of claim 7, wherein said groove is arranged in said first section and exhibits an area of reduced cross section in an end facing said open end, said area corresponding to an end position of said first piston with said piston rod fully extended.

11. The displacement element of claim 1, wherein said one axial direction opposes said another axial direction.

* * * * *